Patented Nov. 5, 1940

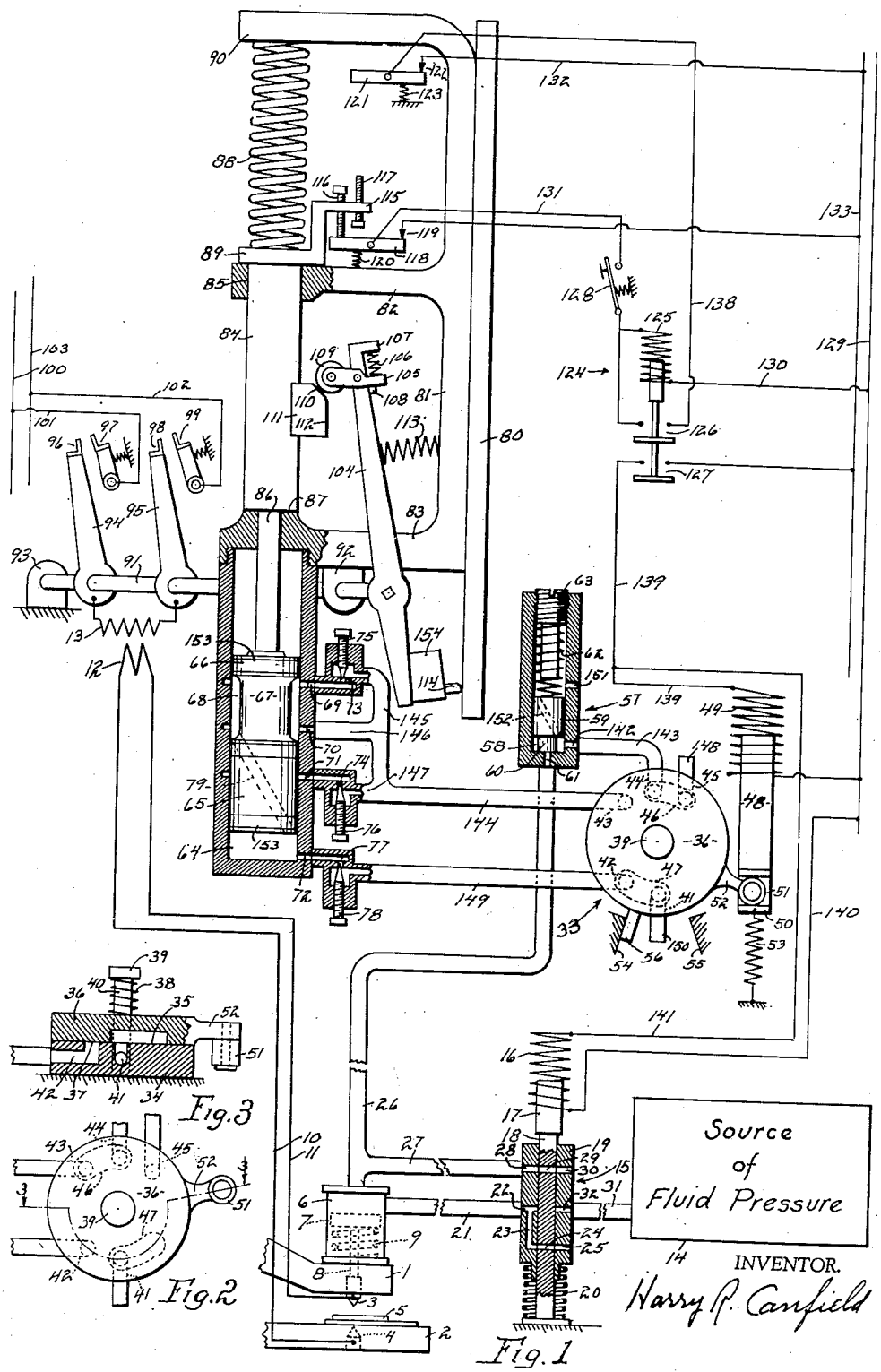

2,220,394

UNITED STATES PATENT OFFICE 2,220,394

ELECTRIC SPOT WELDING SYSTEM

Harry R. Canfield, Cleveland, Ohio, assignor to The Clark Controller Company, Cleveland, Ohio, a corporation of Ohio Application February 20, 1939, Serial No. 257,303

13 Claims. (Cl. 200—97)

This invention relates to electric welding systems and particularly to spot welding systems of the class in which electrodes are pressure-engaged with work to be welded, and electric current of timed duration is caused to flow through the electrodes and the work to effect a weld thereat.

In systems of this class, it is desirable for the operative elements to be under the control of an operator and to function in such manner that he may cause a single weld to be made or a rapid succession of welds optionally.

It is also desirable that after a weld is made, the electrodes will be held in pressure-engagement with the work for a time interval during which the weld may set, such interval being referred to as a cold-hold time interval.

It is also desirable in such systems that a time interval be interposed between successive welds, such time interval being sometimes referred to as a delay interval, to control the frequency of successive welds.

Systems of this class have been proposed comprising an electric contactor operated by fluid pressure, such as compressed air, for timing the welding current, and in such cases it is desirable that the current timing contactor shall not operate until after a desired pressure has been attained between the electrodes and the work, and that the contactor shall not operate except at operating fluid pressure of a suitable pressure value, to insure positive uniform operations thereof.

The present invention comprises elements and the functions thereof by which the foregoing desirable results are attained in an improved manner.

It is therefore among the objects of the invention:

To provide generally an improved welding system of the spot welding class;

To provide in a welding system of the class referred to an improved fluid-pressure operated contactor for timing the welding current; improved means for introducing a delay time interval between successive welds; improved means for introducing a cold-hold time interval after each weld; improved means for delaying the operation of the contactor until the fluid operating pressure thereat has attained a predetermined value; means by which a single weld or a rapid succession of welds may be performed; and improved means for quickly exhausting and resetting the contactor; and these functions singly, or in combination of any two or more.

To provide an improved fluid pressure operated device of the type comprising a fluid pressure operating-chamber, and having improved means by which expansion and contraction of the chamber may be caused to occur at several different velocities, to control: a quickclosing of the welding circuit; timing of the duration of the welding current; timing a cold-hold time interval; timing a delay time interval; and by which these functions may be performed singly or in combination of any two or more.

Other objects will be apparent to those skilled in the art to which my invention appertains.

My invention is fully disclosed in the following description taken in connection with the accompanying drawing, in which;

Fig. 1 is a diagrammatic representation of the elements of a welding system embodying my invention;

Fig. 2 is a fragmentary view of a part of Fig. 1 illustrating the parts thereof in different operative positions;

Fig. 3 is a sectional view taken from the plane 3—3 of Fig. 2.

Referring to the drawing, I have shown at 1 and 2 respectively the upper and lower heads of a welding machine. At 3 is a movable electrode associated with the upper head and at 4 a stationary electrode associated with the lower head, the electrode 3 being movable downwardly to engage work 5 to be welded between the electrodes. A fluid pressure cylinder 6 has therein a piston 7 connected by a piston rod 8 to the electrode 3, whereby fluid pressure in the cylinder above the piston will move the electrode 3 downwardly to pressure-engage the work 5 between the electrodes. A spring 9 in the cylinder is arranged to retract the piston 7 when the pressure of the fluid is removed.

Electric conductors 10 and 11 are provided to conduct welding current from the secondary 12 of a transformer, the primary 13 of which is arranged to be energized in a manner to be described, and the welding current thus transmitted to the electrodes 3 and 4 effects a weld at the work 5.

At 14 is a source of fluid pressure, such for example as compressed air, and the source 14 is to be considered as comprising a reservoir and any means for maintaining fluid pressure in the reservoir.

Indicated generally at 15 is a magnetic valve comprising an energizing winding 16, a magnetic plunger 17 to which is connected a valve plunger 18 reciprocable in a bore in a stationary valve housing 19, the valve plunger 18 moving upwardly when the winding 16 is energized and being moved downwardly by a spring 20 when it is de-energized.

In the position of the valve plunger 18 illustrated, the cylinder 6 is exhausted through a conduit 21, communicating with the cylinder, through a duct 22 in the valve housing 19, a duct 23 communicating therewith, a duct 24 in the valve plunger 18 and an exhaust duct 25 aligned therewith, in the housing 19.

Communicating with the cylinder 6 is also a conduit 26 which, in the normal position of the valve plunger 18, is arranged to be exhausted through a branch conduit 27, a duct 28 in the housing 19, a duct 29 in the plunger 18, and a duct 30 aligned therewith in the housing.

When the winding 16 is energized in a manner to be described, and the plunger 18 is raised, fluid pressure from the source 14 flows by a conduit 31 through the duct 22, to the conduit 21 and thence to the cylinder 6.

Illustrated generally at 33, in Fig. 1, is a magnetic valve of the oscillatory or rotary type, in its normal position, an operated position therefor being illustrated in Figs. 2 and 3. The valve comprises a stationary base 34, having a planar face 35 and an oscillatory head 36 having a planar face 37 engaged with the face 35 by a spring 38 abutting at one end against the head 39 of a bolt, the shank 40 of which passes through the head 36 and is secured to the base 34 and acts as a pivot for the head 36, the other end of the spring 38 abutting against the head 36.

The base 34 has a plurality of inwardly radially extending ducts 41 to 45 inclusive, which terminate axially at the face 35 of the base 34, and the head 36 has two recesses 46 and 47, which in the normal position of the head, illustrated in Fig. 1, effect communication, by the recess 46 between the ducts 44 and 45, and by the recess 47 between the ducts 41 and 42. In the operated position of Fig. 2, the recess 46 connects the ducts 43 and 44.

The head 36 is arranged to be oscillated to the operated position, by a plunger 48 upon energizing a winding 49, associated therewith whereupon a finger 50 on the plunger engages a roller 51 on an arm 52 on the head 36 and rocks the head from the position of Fig. 1 to that of Fig. 2. Upon de-energization of the winding 49, a spring 53 rocks the head back to its normal position, stops 54 and 55 being provided engageable by a finger 56 on the head and determining said positions.

Illustrated generally at 57 is a minimum pressure valve device comprising a cylinder 58 in which reciprocates a piston valve 59 the lower end of which, as at 60, is of reduced diameter and normally covers a fluid pressure admission duct 61. A spring 62, the tension of which is adjustable by a screw 63, holds the valve 59 normally downwardly.

At 64 is a main cylinder in which reciprocates a lower piston 65 and an upper piston 66, connected by a neck 67 of reduced diameter, providing a space 68 around the neck. Three fluid pressure admission ducts 69, 70 and 71 and an exhaust duct 72 are provided communicating with the cylinder, flow to the ducts 69 and 71 being controlled by flow ports 73 and 74 the effective sizes of which are regulated and controlled by needle valves 75 and 76, and exhaust at the duct 72 occurring by way of a flow port 77, the effective area of which is controlled by needle valve 78. A duct 79 extending through the lower piston 65 communicates between the space 68 and the cylinder 64 below the piston.

Upward movement of the pistons 65 and 66, effected in a manner to be described, operates an electric contactor construction to close and then open an electric circuit to energize the primary 13 of the transformer referred to, and this contactor will now be described.

A panel 80 has mounted thereon a frame 81 having upper and lower laterally extending arms 82 and 83. A plunger 84 reciprocates at an upper portion in a bore 85 in the arm 82, and its lower position, which is of reduced diameter as at 86, reciprocates in a bore in the arm 83, the reduced diameter portion functioning as a piston rod and being connected at its lower end to the upper piston 66. The reduction of diameter provides a shoulder 87 functioning as a downward stop on the arm 83 for the plunger 84.

A spring 88 abuts at its lower end upon an arm 89 on the upper end of the plunger, and at its upper end abuts upon an extension 90 of the frame 81 and normally tends to move the pistons downwardly.

An oscillatory shaft 91 is disposed horizontally and mounted at one end in a bearing 92 depending from the frame arm 83 and, axially spaced therefrom, in a bearing 93, supported stationarily in any suitable manner. Secured to the shaft is a pair of contactor arms 94 and 95, the arm 94 carrying a contact 96 movable into and out of engagement with a stationary contact 97 and the arm 95 carrying a contact 98 movable into and out of engagement with a stationary contact 99. When the shaft 91 is rocked clockwise, in a manner to be described, it engages the said contacts and current flows from a supply main 100 by a wire 101 through the engaged contacts 96 and 97, arm 94, transformer primary 13, arm 95, contacts 98 and 99, by a wire 102 to the other supply main 103, whereby, whenever the contacts are thus engaged, the transformer primary 13 is energized.

The means to oscillate the shaft 91 clockwise to engage the said contacts and counter-clockwise to disengage them, to thereby time the energization of the primary 13, and consequently the duration of the current impulse to the electrodes 3 and 4, will now be described.

The shaft 91 has an arm 104 secured thereto having pivoted on its upper end portion a finger 105, normally constrained to rock in the clockwise direction by a spring 106 abutting at its upper end upon an extension 107 of the arm, and at its lower end upon the finger, the finger being normally stopped against a stop 108 on the arm. At the opposite end of the finger 105, it carries a roller 109, which normally is disposed adjacent to an inclined cam face 110 on a cam 111 secured to the plunger 84, the cam having also a substantially vertical cam surface 112. A spring 113 abutting at one end upon the frame 81 and at its opposite end upon the arm 104 normally constrains the arm in a counter-clockwise direction, in which position it is stopped by a stop finger 114 on the arm engageable with the panel 80.

When the plunger 84 is reciprocated upwardly, the cam surface 110 engages the roller 109 and through it rocks the arm 104 clockwise to close the contacts 96 to 99 inclusive, as described. During continued movement of the plunger 84, and for a time interval, the roller 109 rolls downwardly along the surface 112 and when the plunger 84 reaches an upper point in its stroke, the roller 109 rolls off of the cam and the spring 113 returns the arm 104 to its normal position illustrated, opening the contacts 96 to 99 inclusive, thereby timing the welding current to the electrodes 3 and 4 as determined by the velocity of the plunger 84.

The said arm 89 on the plunger 84 has a lateral extension 115 carrying a downwardly extending adjustable screw 116 and an upwardly extending adjustable screw 117, the screw 116 normally engaging a pivoted contactor arm 118 and holding it in engagement with a contact 119, a spring 120 being provided to rock the arm 118 to disengage the contact 119 when the arm extension 115 is moved upwardly by the plunger 84. At the upper portion of the stroke of the plunger, the screw 117 engages a contact arm 121 and rocks it out of engagement with a contact 122, the arm normally being held in engagement with the contact by a spring 123.

At 124 is an electro-magnetic relay comprising a winding 135, which when energized operates the relay and closes normally open contacts 126 and 127.

An operator's control contactor of the normally open type is illustrated generally at 128.

Parts, including certain electric circuits not hitherto described, will now be described in connection with a description of the mode of operation of the apparatus as a whole.

When it is desired to make a weld, an operator closes the manually operable operator's contactor 128, whereupon current flows from a current supply main 129 by a wire 130, through the winding 125 of the relay 124, through the operator's contactor 128 by a wire 131 to the contactor arm 121, and through the arm and through the contact 122 engaged therewith and by a wire 132 to the other supply main 133.

The relay 124 is thereby operated closing the contacts 126 and 127, and a maintaining circuit is made for the winding 125 from the supply main 129, by a wire 130 through the winding 125 through closed contacts 126 by a wire 138 to the contactor arm 121, through the arm and through the engaged contact 122, and by a wire 132 to the other supply main 133, whereby the relay 124 will be retained operated even if the operator's contactor 128 is released.

It will be noted that the operation of the relay 124 occurs through the contact 119, but that it is maintained closed through the contact 122.

When the relay 124 operated, current also flowed from the supply main 129 through the winding 49 of the magnetic valve 33 and thence by a wire 139 through the closed contacts 127 to the other main 133, thereby energizing the winding 49 and moving the magnetic valve 33, from the position of Fig. 1 to that of Figs. 2 and 3.

At the same time current flows from the supply main 129 by wire 140 to and through the winding 16 of the magnetic valve 15 energizing the winding and raising the valve plunger 18, the current returning by a wire 141 to the wire 139 and through contact 127 to the other supply main 133.

Upon operation of the magnetic valve 15, fluid pressure, such as compressed air, flows from the source 14 by way of the conduit and duct path above described to the cylinder 6, forcing the electrode 3 downwardly to engage it with the work 5. As will be understood, with devices of this class, the fluid pressure in the cylinder 6, and therefore in the conduit 26 communicating therewith is a rising pressure, due to the expansion of the fluid pressure in the cylinder, and this rising pressure is communicated by the conduit 26 through the duct 61 to the cylinder 58 of the minimum pressure device 57. This pressure acting upon the valve 59 moves it upwardly and when the pressure has attained a sufficiently high value, according to a desired electrode pressure and determined by the adjustment of the spring 62, the valve 59 is raised from the end of the duct 61, and thereupon the full area of the piston valve 59 is exposed to the pressure and it moves upwardly with a quick jump action admitting the full fluid pressure to the cylinder 58.

This pressure is then transmitted by a duct 192 from the cylinder 58 to a conduit 143 communicating with the duct 44. In the operated position of the valve, illustrated in Fig. 2, the fluid under pressure continues to flow from the duct 44, through the recess 46 to the duct 43 with which communicates a conduit 144. The conduit 144 is branched into three parts, 145, 146 and 147. The flow of fluid pressure in the branch 147 is cut off at the duct 71 which communicates with the cylinder 64 at a point opposite and covered by the piston 65, the piston overlapping the end of the duct 71.

The fluid pressure in the conduits 145 and 146, however, communicates through the ducts 69 and 70 with the space 68 around the neck 67. The flow to the duct 70 is unrestricted while that at the duct 69 is restricted and controlled by the needle valve 75. The unrestricted flow of pressure through the duct 70 communicating with the space 68 and transmitted through the duct 79 to the cylinder 64 below the piston 65, exerts a powerful full pressure upward thrust on the piston and moves it upwardly with a quick movement until the upper end of the piston 65 covers the duct 70, after which the upward movement of the piston is continued at a controlled and retarded rate by the retarded flow through the flow port 73 and duct 69.

The said quick movement of the piston 65 causes the cam 111, through its cam surface 110, to engage the roller 109 and rock the arm 104 far enough to engage the contacts 96 to 99 and the continued movement of the piston at a retarded rate causes the roller 109 to roll down the substantially vertical cam-face 112, maintaining the contacts closed. At the end of a predetermined time determined by the adjustment of the needle valve 75, the piston 65 moves far enough to disengage the roller 109 from the cam and the arm 104 is returned by the spring 113 and the contacts 96 to 99 are opened. As long as the contacts are engaged, the transformer 13—12 is energized, giving current to the welding electrodes 3 and 4. By this means, the contacts 96 to 99 are quickly closed, and then held closed for a time interval which times the duration of the welding current at the electrodes 3 and 4, the entire period and the length of the welding current impulse being adjustably variable by the needle valve 75.

Where relatively wide open adjustments of the needle valve 75 are desired, the plunger will be propelled upwardly at a rapid rate, which would be the case when short current impulses are wanted. In such cases, the movement of the cam 111 may be so rapid that it will kick the roller 109 away from the cam. This action is utilized in timing short welding current, and in some cases a weight 154 is attached to the arm 104 below the shaft 91, and the distance from the shaft may be adjustable, so that such short time intervals of welding current will be controlled by the spring 113 and the inertia of the weight 154. This action in timing the welding current is more completely illustrated and described in the co-pending application of Edward J. Beiderman, Serial Number 84,981, filed June 13, 1936, for Improvements in time controlled electric switches, to which reference may be had.

The ducts 69, 70 and 71 are so spaced apart that at the end of the said time interval, the duct 69 will be covered by the piston 65 and flow therethrough will thereby be cut off; and as will be understood, flow through the duct 70 has already been cut off; and at or about this position of the piston 65, the lower end thereof uncovers the duct 71 and fluid pressure in the conduit 144 and the branch conduit 147 is admitted to the cylinder 64 below the piston 65, through the flow port 74, at a rate controlled by the needle valve 76. By this means, the velocity of the plunger 84 after the contacts 96 to 99 have been opened, is controlled independently of the duration of the current, and a second time interval is thereby initiated during which the electrodes 3 and 4 remain engaged with the work, although the welding current has been cut off, which time interval may be called the cold-hold interval. The piston 65 and the plunger 84 continue to move upwardly at this new retarded rate, at the end of which, which occurs before the lower end of the piston 65 uncovers the duct 70, the screw 117 moved by the plunger 84 engages the contactor arm 121 and disengages it from the contact 122. Inasmuch as this contact is in the maintaining circuit for the winding 125 of the relay 124, the relay moves to open position opening the contacts 126 and 127.

As described above, the windings 49 and 16 of the magnetic valves 33 and 15 are energized through the contacts 127, and now that these are open, these windings are de-energized and the valves move to their normal positions, illustrated in Fig. 1. The valve plunger 16 of the valve 15 exhausts the cylinder 6 through the conduit 21 and out at the duct 25, allowing the spring 9 to restore the piston 7 and remove the electrode 3 from the work. The plunger 18 also exhausts the conduit 26 through the branch conduit 27 and out at the duct 30, this being desirable in many cases, because the conduit 26 may be of great length, and rapid repeat operations require a quick setting of the minimum pressure device 57, which would be delayed by a slow exhaust of the conduit 26.

The cylinder 58 of the minimum pressure device 57 is furthermore exhausted through the conduit 143 in communication with the duct 44, which is now connected to an exhaust conduit 148 communicating with the duct 45 and the recess 46 which communicates with the duct 44. The minimum pressure is cut off at the conduit 144 when the recess 46 moves out of registration with the duct 43 as it returns to its normal position, illustrated in Fig. 1. The cylinder 64 exhausts through the duct 72, through the flow control port 77 under the control of the needle valve 78 into a conduit 149 connected to the duct 42 which, in the normal position of the valve illustrated in Fig. 1, communicates through the recess 47 to the duct 41 which is connected to an exhaust duct 150.

Consequently, the piston 65 and the plunger 84 now start to move downwardly under the impulsion of the spring 88 and the rate of movement is determined by the adjustment of the needle valve 78, as will be understood. A time interval is therefore initiated which may be called a delay interval, during which the plunger moves downwardly. At the end of the downward movement, the screw 116 moving with the plunger 84 engages the contactor arm 118 and moves it into engagement with the contact 119.

If, at this time, the operator's contact has been closed, as it would be if a repeating succession of welding operations were desired, the apparatus will immediately go through another cycle, and another weld will be effected at the work 5, which it will be assumed, has been moved to a new position. If only a single weld is wanted and the operator's contactor 128 has therefore been left open, the apparatus will come to rest in its original condition.

Referring again to the minimum pressure device 57, if leakage should occur at the duct 61, under the end portion 60 of the valve 59, such leakage might accumulate under the piston and, acting upon the large diameter of the piston, might prematurely move it upwardly. To avoid this a duct 152 is provided extending through the piston valve from the cylinder 58 to a point above the valve and there is exhausted outwardly through a bleeder duct 151.

My invention is not limited to the exact features of construction illustrated and described, for example, I have preferred to illustrate pistons 65 and 66 sealed in the cylinder 64 by piston rings 153, whereas the piston valve 59 in the cylinder 58 is not sealed in this manner. These and other types of seal may be provided in either case. Also, while I have shown two forms of valve structure, 15 and 33, it will be understood that other parts may be substituted. Similarly other changes and modifications may be made within the spirit of my invention without sacrificing its advantages, and within the scope of the appended claims.

Reference may be had to the co-pending application of Harry R. Canfield, Serial Number 257,302, filed February 20, 1939, for Improvements in electric spot welding systems, in which subject matter illustrated and described in the instant case, but not claimed, is being claimed.

I claim:

1. In a timing mechanism, a normally contracted expansible fluid pressure chamber having a movable wall, a source of fluid pressure, means to communicate fluid pressure from the source to the chamber at a substantially unretarded rate to effect an initial quick movement of the wall, contactor means operated by said movement to close an electric circuit, means operable responsive to said movement of the wall to effect discontinuance of fluid pressure supply at said unretarded rate and to communicate fluid pressure to the chamber at a first retarded rate to effect subsequent retarded movement of the wall to determine a current timing interval, means for holding the contacts closed during said timing interval, and for opening them at the end of the interval, means operable responsive to said retarded movement of the wall to effect discontinuance of fluid pressure at the said retarded rate and to communicate fluid pressure to the chamber at a second retarded rate to determine a second time interval, means for exhausting fluid pressure from the chamber at the end of the second time interval to allow the chamber to contract, and means to cause the exhaust to occur at a predetermined rate to effect retarded restoring movement of the movable wall to determine a restoring time interval.

2. The mechanism described in claim 1 and in which a normally restored magnetic valve effects communication of source fluid pressure to the chamber when energized and exhausts it when restored, and the movable wall operates electric contacts to de-energize the valve at the end of the second time interval and operates electric contacts to render the valve again operable only at the end of the restoring time interval.

3. In a contactor mechanism, contacts, a movable member, mechanism operated by movement of the member to close the contacts for a time period commensurable with the velocity of the movable member, a normally contracted expansible chamber having a movable wall for moving the movable element, a source of fluid pressure, means including valve means operable responsive to movement of the wall to admit fluid pressure from the source to the chamber to effect in succession a quick movement of the wall to effect quick closing of the contacts, a timed movement of the wall to effect timing of the period during which contacts are closed, a timed movement of the wall to effect a time interval during which the contacts are open, and a timed contracting movement of the wall to determine a time interval for restoring of the wall.

4. In an electro-fluid pressure system, a source of fluid pressure, magnetic valve means, current timing contactor mechanism comprising a normally restored element movable by fluid pressure responsive means and contactor contacts closed by said movement for a time period commensurable with the velocity thereof, the magnetic valve means when operated and restored respectively effecting communication of fluid pressure from the source to the mechanism and exhausting of it therefrom, other contactor means operated responsive to movement of the movable element to effect de-energization and restoring of the magnetic valve means, means responsive to movement of the movable element to control the rate of fluid pressure communication to the mechanism to effect first a quick movement thereof to effect closure of the timing contactor contacts followed by a timing movement thereof to time the period during which the contactor contacts remain closed and at the end of which they are opened, followed by a timed movement during which the fluid pressure is continued communicated to the mechanism and followed by a delayed restoring movement of the movable element.

5. In a contactor mechanism, contacts, a movable member, power means to move the movable member from a normal position and effect return thereto, mechanism operated by movement of the movable member to close the contacts for a time period commensurable with its velocity, means to effect applying of power to the movable member to effect in succession a quick movement thereof to effect quick closing of the contacts, a timed movement of the movable member to time the period during which the contacts are closed, a timed movement of the movable member for timing a time period during which the contacts are open and a timed movement of the movable member to determine a time interval of return movement thereof to the normal position.

6. In a contactor mechanism, contacts, a movable member, power means to move the movable member from a normal position and effect return thereto, mechanism operated by movement of the movable member to close the contacts for a time period commensurable with the velocity of the movable member, means to effect applying of power to the movable member to effect in succession a timed movement of the movable member for timing the period during which the contacts are closed, a timed movement of the movable member for timing a period during which the contacts are open and a timed movement of the movable member to determine a time interval of returning of the movable member to its normal position.

7. In a contactor mechanism, contacts, a movable member, power means to move the movable member from its normal position, mechanism operated by movement of the movable member to close the contacts for a time period commensurable with the velocity of the movable member, means to effect applying of power to the movable member to effect in succession a timed movement of the movable member for timing the period during which the contacts are closed, and a timed movement thereof for timing an interval during which the contacts are open, the parts being arranged to effect return of the movable member to a normal position after termination of the second said time interval.

8. In a contactor mechanism, contacts, a reciprocable member, power means for reciprocating the member, mechanism operated by movement of the member to close the contacts for a time period commensurable with the velocity of reciprocatory movement in one direction, means to effect applying of power to the member to effect during reciprocation in said one direction a quick movement of the movable member to effect quick closing of the contacts, a timed movement of the member for timing the period during which the contacts are closed, a timed movement of the member for timing a time period during which the contacts are open, and means for timing the return reciprocatory movement of the member.

9. In a contactor mechanism, contacts, a reciprocable member, power means to effect reciprocation thereof, mechanism operated by movement of the member in one reciprocatory direction to close the contacts for a time period commensurable with the velocity of the member, means to effect applying of power to the reciprocatory member to effect in succession in said one direction of reciprocation, timed movement of the member for timing the period during which the contacts are closed, a timed movement of the member for timing the period during which the contacts are open, and means for timing return reciprocation of the member to a normal position.

10. In a contactor mechanism, contacts, a reciprocable member, power means for reciprocating the member, mechanism operated by movement of the member in one reciprocatory direction to close the contacts for a time period commensurable with the velocity of the member, means to effect applying of power to the member to effect in succession in said power effected reciprocatory direction of the member, a time interval of the member for timing the period during which the contacts are closed and a timed movement of the member for timing a time period during which the contacts are open.

11. In a timing mechanism, a normally contracted expansible fluid pressure chamber having a movable wall, a source of fluid pressure, means to communicate fluid pressure from the source to the chamber to effect movement of the wall, contactor means operated by said movement to close an electric circuit, for a time interval commensurable with the velocity of the movable wall, means to retard the rate of fluid pressure communication to determine a current timing interval, means operable responsive to said retarded movement of the wall to effect discontinuance of fluid pressure at the said retarded rate and to communicate fluid pressure to the chamber at a second retarded rate to determine a second time interval, means for exhausting fluid pressure from the chamber at the end of the second time interval to allow the chamber to contract, and means to cause the exhaust to occur at a predetermined rate to effect retarded restoring movement of the movable wall to determine a restoring time interval.

12. In a timing mechanism, a normally contracted expansible fluid pressure chamber having a movable wall, a source of fluid pressure, contactor means operated by movement of the movable wall to close an electric circuit for a timed period commensurable with the velocity of the movable wall, means to effect said communication of fluid pressure at a retarded rate to determine the current timing interval, means operable responsive to said retarded movement of the wall to effect discontinuance of fluid pressure at the said retarded rate and to communicate fluid pressure to the chamber at a second retarded rate to determine a second time interval during which the contactor is open, and means for exhausting fluid pressure from the chamber at the end of the second time interval to allow the chamber to contract and the movable wall to return to a normal position.

13. In an electro-pneumatic system, a source of fluid pressure, a fluid pressure chamber having a movable wall, electric contacts and mechanism associated therewith operable by movement of the wall to close the contacts and then open them after a time interval commensurable with the velocity of the wall, means associated with the chamber to admit fluid pressure thereto at a controlled rate to control the velocity of the wall and the said time interval and to control independently thereof the velocity of subsequent movement of the wall for a second time interval, a magnetic valve controlling the fluid pressure communication to the chamber, auxiliary contacts operable responsive to the movement of the wall after the second time interval and effecting operation of the magnetic valve to cause it to exhaust the fluid pressure from the chamber after said second time interval to thereby effect restoring of the wall.

HARRY R. CANFIELD.